(12) United States Patent
Bolshtyansky et al.

(10) Patent No.: US 9,281,655 B2
(45) Date of Patent: Mar. 8, 2016

(54) TRANSMISSION LINK WITH MULTIPLE ORDER RAMAN PUMPS

(71) Applicant: Lumentum Operations LLC, Milpitas, CA (US)

(72) Inventors: Maxim Bolshtyansky, East Windsor, NJ (US); Gregory Cowle, San Jose, CA (US)

(73) Assignee: Lumentum Operations LLC, Milpitas, CA (US)

( * ) Notice: Subject to any disclaimer, the term of this patent is extended or adjusted under 35 U.S.C. 154(b) by 28 days.

(21) Appl. No.: 14/278,869

(22) Filed: May 15, 2014

(65) Prior Publication Data

US 2015/0288136 A1  Oct. 8, 2015

Related U.S. Application Data

(60) Provisional application No. 61/826,323, filed on May 22, 2013.

(51) Int. Cl.
*H01S 3/00* (2006.01)
*G03H 1/22* (2006.01)
*H01S 3/30* (2006.01)
*H04B 10/291* (2013.01)
(Continued)

(52) U.S. Cl.
CPC ............. *H01S 3/302* (2013.01); *H01S 3/06754* (2013.01); *H01S 3/094096* (2013.01); *H04B 10/2504* (2013.01); *H04B 10/2916* (2013.01); *H04J 14/02* (2013.01)

(58) Field of Classification Search
CPC ............ H04B 10/2916; H04B 10/2504; H01S 3/06754; H01S 3/302; H01S 3/094096; H04J 14/02
USPC ............................................... 359/333, 33, 34
See application file for complete search history.

(56) References Cited

U.S. PATENT DOCUMENTS 6,163,636 A  12/2000  Stentz et al. ................. 385/24
6,344,922 B1  2/2002  Grubb et al. ................. 359/334
(Continued)

FOREIGN PATENT DOCUMENTS

EP  1102114 A1  5/2001  ............... G02F 1/35
EP  1225666 A2  7/2002  ............... H01S 3/30
(Continued)

OTHER PUBLICATIONS

Bouteiller, J.-C.; Brar, K.; Headley, C., "Quasi-Constant Signal Power Transmission," Optical Communication, 2002. ECOC 2002. 28th European Conference on, vol. 3, no., pp. 1,2, Sep. 8-12, 2002.*
(Continued)

*Primary Examiner* — Ken Vanderpuye
*Assistant Examiner* — Abbas H Alagheband
(74) *Attorney, Agent, or Firm* — Harrity & Harrity, LLP

(57) ABSTRACT

An optical transmission link pumped with multiple orders Raman pumps on both ends of the link is disclosed. At least one first-order Raman pump and at least two higher-order Raman pumps are provided on each end for reducing optical power variation of the optical signal along the optical transmission link. Wavelengths and optical power levels of the multiple-order Raman pumps and the additional Raman pump(s) can be selected by computer simulation to lessen the spatial optical power variation of the optical signal.

20 Claims, 11 Drawing Sheets

(51) Int. Cl.
*H01S 3/067* (2006.01)
*H01S 3/094* (2006.01)
*H04B 10/25* (2013.01)
*H04J 14/02* (2006.01)

(56) References Cited

U.S. PATENT DOCUMENTS

| | | | |
|---|---|---|---|
| 6,480,326 B2 | 11/2002 | Papernyi et al. | 359/334 |
| 6,501,593 B2 | 12/2002 | Akasaka et al. | 359/341.31 |
| 6,624,928 B1 * | 9/2003 | Masum-Thomas | H01S 3/302 359/341.31 |
| 6,631,025 B2 | 10/2003 | Islam et al. | 359/334 |
| 6,785,042 B1 | 8/2004 | Onaka et al. | 359/334 |
| 6,882,467 B1 | 4/2005 | Emori et al. | 359/334 |
| 6,903,863 B1 | 6/2005 | Carniel et al. | 359/334 |
| 7,123,834 B2 * | 10/2006 | Hullin | H04J 14/0221 398/162 |
| 7,170,672 B2 * | 1/2007 | Fella | H04B 10/2916 359/334 |
| 7,277,610 B2 * | 10/2007 | Demidov | H01S 3/0675 372/3 |
| 8,477,411 B2 * | 7/2013 | Griseri | H01S 3/302 359/334 |
| 2002/0097480 A1 * | 7/2002 | Dominic | H04B 10/296 359/333 |
| 2003/0076577 A1 | 4/2003 | Dominic et al. | 359/334 |
| 2003/0151799 A1 * | 8/2003 | Wight | H01S 3/2383 359/334 |
| 2006/0126158 A1 * | 6/2006 | Fella | H04B 10/2916 359/334 |
| 2011/0013267 A1 * | 1/2011 | Griseri | H01S 3/302 359/334 |

FOREIGN PATENT DOCUMENTS

| | | | |
|---|---|---|---|
| EP | 1312975 A1 | 5/2003 | G02F 1/35 |
| EP | 1225666 A3 | 5/2006 | H01S 3/30 |
| EP | 1916565 A1 | 4/2008 | G02F 1/35 |

OTHER PUBLICATIONS

European Search Report from corresponding EP application No. EP14168490.

Boutellier et al., "Quasi-Constant Signal Power Transmission", Optical Communication, 2002, ECOC 2002, 28th European Conference on Copenhagen, Denmark, Sep. 8-12, 2002, Piscataway, NJ, USA, IEEE, pp. 1-2, Sep. 8, 2002.

Tong et al., "Investigation and optimization of bidirectionally dual-order pumped distributed Raman amplifiers", Optics Express, vol. 12, No. 9, pp. 1794-1802, May 3, 2004.

Pincemin et al., "Challenges of 40/100Gbps and higher-rate deployments over long-haul transport networks", Optical Filter Technology, vo. 17, No. 5, pp. 335-362, Aug. 26, 2011.

Faralli et al., "Impact of double Rayleigh scattering noise in distributed higher order Raman pumping schemes", IEEE Photonics Technology Letters, IEEE Service Center, Piscataway, NJ, USA, vol. 15, No. 6, pp. 804-806, Jun. 1, 2003.

Papernyi et al., "Third-order cascaded Raman amplification", Optical Fiber Communications Conference (OFC), Post conference Technical Digest, Post deadline Papers, Opt. Soc. America, Washington DC, USA, [Trends in Optics and Photonics Series (TOPS)], IEEE, vol. TOPS, vol. 70, pp. 847-849, Mar. 17, 2002.

* cited by examiner

TRANSMISSION LINK WITH MULTIPLE ORDER RAMAN PUMPS

CROSS-REFERENCE TO RELATED APPLICATIONS

The present invention claims priority from U.S. Provisional Patent Application No. 61/826,323 filed May 22, 2013, which is incorporated herein by reference.

TECHNICAL FIELD

The present invention relates to optical communications, and in particular to fiberoptic communications using Raman amplification.

BACKGROUND OF THE INVENTION

In a wavelength division multiplexing (WDM) optical transmission system, optical signals at a plurality of wavelengths are encoded with digital streams of information. These encoded optical signals, or "wavelength channels", are combined together and transmitted through a series of transmission links, each link including a span of an optical fiber. At a receiver end of the WDM optical transmission system, the wavelength channels are separated, whereby each wavelength channel can be detected by an optical receiver.

While propagating through an optical fiber, light tends to lose power. This power loss is well understood and is related to the physics of propagation of light in the fiber. Yet some minimal level of wavelength channel power is required at the receiver end to decode information that has been encoded in a wavelength channel at the transmitter end. To boost optical signals propagating in an optical fiber, optical amplifiers can be deployed at multiple locations along a WDM optical transmission system. Optical amplifiers can extend a total length of a WDM optical transmission system to thousands of kilometers, by amplifying optical signals to power levels close to the original levels of optical power at the transmitter end.

There are two main types of optical amplifiers used in fiberoptic transmission systems. The first type is an erbium doped fiber amplifier (EDFA), which uses the phenomenon of stimulated optical emission to amplify light. The second type is a Raman amplifier, which uses the phenomenon of stimulated Raman scattering in the transmission optical fiber to amplify light propagating in the transmission fiber.

There are two types of noise that fundamentally leads to the transmission penalties: 1) noise generated by amplifiers (ASE noise) and 2) transmission fiber induced non-linarites that generate signal which can be described as "nonlinear noise". In large capacity transmission systems employing coherent multi-level signal formats, the nonlinear noise is proportional to cube of the optical power density. While the former, ASE noise impact increases when optical signal power is small, the later, nonlinear noise impact is larger when the optical signal is large. It is traditional to express ASE noise impact through Noise Figure (NF) of the amplifier. Large values of NF correspond to higher ASE impact on transmission system.

Therefore, it would be significantly more beneficial to have a constant optical power of the signal along the transmission fiber, rather than spatially varying power, since the nonlinearity will be very strong at peaks of the optical power variation along the fiber, and ASE noise impact will be stronger where the signal optical power is low.

Raman amplifiers can have a lower noise figure than EDFA, because they can provide amplification distributed over long length of optical fiber, thus avoiding locations where optical power density is too low. However, Raman gain is normally not distributed evenly along the transmission fiber. This happens because the Raman pump optical power level decays away from the pump source, causing a variation of optical power levels of the optical signal being amplified.

Grubb et al. in U.S. Pat. No. 6,344,922 disclose an optical transmission system including a plurality of Raman pumps. To even out Raman pump light distribution in the transmission fiber, a plurality of fiber Bragg gratings (FBGs) are disposed along the transmission fiber. The FBGs are constructed not to reflect optical signal, while selectively reflecting light of at least some of the Raman pumps. While evening out Raman pump optical power distribution in the transmission fiber, thus improving amplifier NF, FBGs can cause an undesired lasing, destabilizing the transmission system.

Ania-Castañón in an article "Quasi-lossless transmission using second-order Raman amplification and fibre Bragg gratings", Optics Express 2004 Vol. 12, No. 19, p. 4377, discloses a transmission system including a span of optical transmission fiber pumped by primary pumps disposed at both ends of the transmission fiber. Two fiber Bragg grating (FBG) reflectors are coupled at both ends of the fiber. The central wavelength of the FBG reflectors is 1455 nm, which is close to the Stokes peak of the primary pumps. The pair of FBG reflectors creates a cavity for the radiation at this wavelength. If the primary pumps power is above the threshold necessary to overcome the attenuation of the first Stokes light, a stable secondary pump at 1455 nm is generated in the cavity from the amplified spontaneous emission (ASE) noise at this wavelength. This secondary pump is used to amplify the signal centered at 1550 nm. The secondary pump presents a nearly constant combined forward- and backward-propagating power, and accordingly can provide a nearly constant gain for the optical signal at 1550 nm. The gain can be adjusted to closely match the signal attenuation at every step of the propagation. An experimental verification of this concept has been reported by Ania-Castañón et al. in an article "Ultralong Raman Fiber Lasers as Virtually Lossless Optical Media", Phys. Rev. Lett. 2006 Vol. 96, 023902, reporting a lossless (+−0.2 dB) 70 km long transmission link. Detrimentally, the lasing cavity can create noise caused by optical instability of lasing in a multi-kilometer long optical cavity.

Stentz et al. in U.S. Pat. No. 6,163,636 disclose an optical communication system including multiple-order Raman amplifiers. Raman pumps of second order are used to amplify Raman pump light of the first order, which then amplifies optical signal. This allows the optical signal power distribution to become more even, reducing ASE noise or improving Noise Figure.

Papernyj et al. in U.S. Pat. No. 6,480,326 disclose an optical fiber communication system similar to that of Stentz et al. The optical fiber communication system of Papernyj et al. includes "seed" Raman pumps. Referring to FIG. 1A, a transmission system 100 includes a transmission fiber 5 between first 1 and second 2 terminals, a primary Raman pump 6 coupled to the first terminal 1 via wavelength division multiplexors (WDMs) 7 and 11 coupled by a fiber link 12. Seed sources 8 and 9 are coupled to the first terminal 1 via WDMs 10 and 11. In operation, the primary Raman pump 6 pumps the transmission fiber 5. The primary pump light interacts with light provided by the seed sources 8 and 9, causing the seed light to gain power as it propagates through the transmission fiber 5. As the seed light gains power, it begins to pump the optical signal propagating from the first terminal 1 to the second terminal 2, thus lessening the signal power variation. For instance, referring to FIG. 1B, the signal power variation is lessened from 14 dB peak-to-peak in a previous prior art system (solid line) to approximately 8 dB peak-to-peak in the transmission system 100 (dashed line).

The prior art, while providing means for lessening optical signal power variation along an optical fiber span, does not yet provide a capability to reliably achieve a substantially "lossless" transmission, where optical signal power is stable in time and varies insignificantly over long optical fiber spans.

SUMMARY OF THE INVENTION

The inventors have discovered that a multi-order Raman pumping system can achieve a nearly lossless transmission when both sides of a transmission fiber are pumped by multiple higher-order Raman pumps in addition to first-order Raman pumps. When emission wavelengths and optical power levels of the higher-order pumps are properly selected, a near lossless transmission can be obtained. The higher-order Raman pumps can include at least one second-order Raman pump and at least one third-order Raman pump.

In accordance with the invention, there is provided a transmission link for transmitting an optical signal, the transmission link comprising:

an at least 60 km long optical fiber span for propagating the optical signal therein from a first end to a second opposed end thereof;

first and second pump assemblies optically coupled to the first and second ends of the optical fiber span, respectively, the first and second pump assemblies each comprising: a single-wavelength or multi-wavelength first-order Raman pump for providing first-order Raman pump light for amplifying the optical signal; and first and second higher-order Raman pumps for providing higher-order Raman pump light for amplifying the first-order Raman pump light;

wherein the first-order and the first and second higher-order Raman pumps are configured for operation at such emission wavelengths and non-zero optical power levels that the peak-to-peak variation of an optical power of the optical signal along the optical fiber span is less than 5 dB.

In accordance with the invention, there is further provided transmission link for transmitting an optical signal including a plurality of wavelength channels spanning a wavelength range of at least 25 nm, the transmission link comprising:

an at least 60 km long optical fiber span for propagating the optical signal therein from a first end to a second opposed end thereof;

first and second WDM combiners optically coupled to the first and second ends of the optical fiber span, respectively, for coupling pump light thereinto;

first and second pump subassemblies optically coupled to the first and second WDM combiners, respectively, for providing the pump light, the first and second pump subassemblies each comprising:

first and second first-order Raman pumps for providing first-order Raman pump light for amplifying the optical signal;

first and second second-order Raman pumps for providing second-order Raman pump light for amplifying the first-order Raman light; and a first third-order Raman pump for providing third-order Raman pump light for amplifying the second-order Raman light;

wherein the first and second first-order and second-order Raman pumps and the first third-order Raman pump of the first and second pump subassemblies are configured for operation at such emission wavelengths and non-zero optical power levels that the peak-to-peak variation of an optical power P of each one of the wavelength channels along the optical fiber span is less than 4 dB.

In accordance with another aspect of the invention, there is further provided a method of obtaining a substantially loss-less transmission of an optical signal propagating from a first to a second end of an optical fiber span, the method comprising:

(a) providing the optical fiber span having a length of at least 60 km between the first and second ends thereof;

(b) optically coupling to the to the first and second ends of the optical fiber span first and second pump subassemblies, respectively, the first and second pump subassemblies each comprising $N_1$ first-order Raman pumps and $N_2$ higher-order Raman pumps, wherein $N_1$ is an integer $\geq 1$, and $N_2$ is an integer $\geq 2$;

(c) upon completion of steps (a) and (b), coupling the optical signal to the first end of the optical fiber span; and (d) using pump controllers to operate the $N_1$ first-order Raman pumps and the $N_2$ higher-order Raman pumps at such emission wavelengths and optical power levels that a peak-to-peak variation $\Delta P_{P2P}$ of an optical power of the optical signal along the optical fiber span is less than 5 dB.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
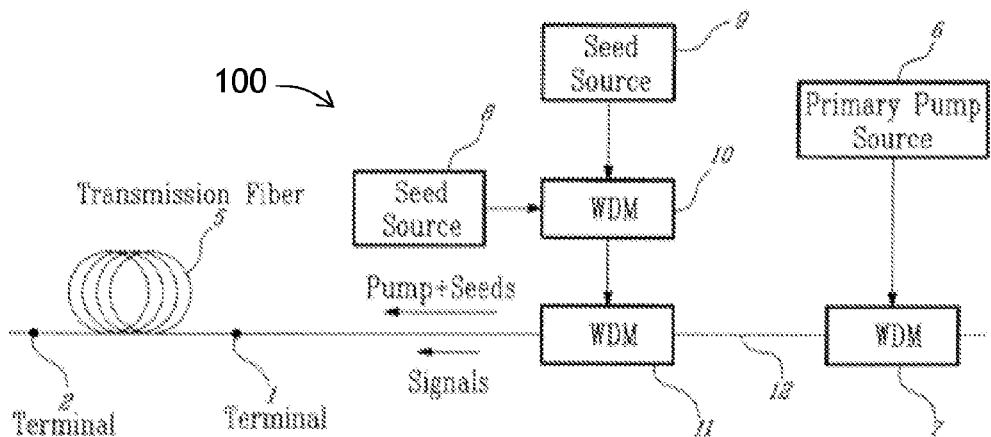
FIG. 1A is a schematic view of a prior-art optical fiber communication system.
Figure 1B:
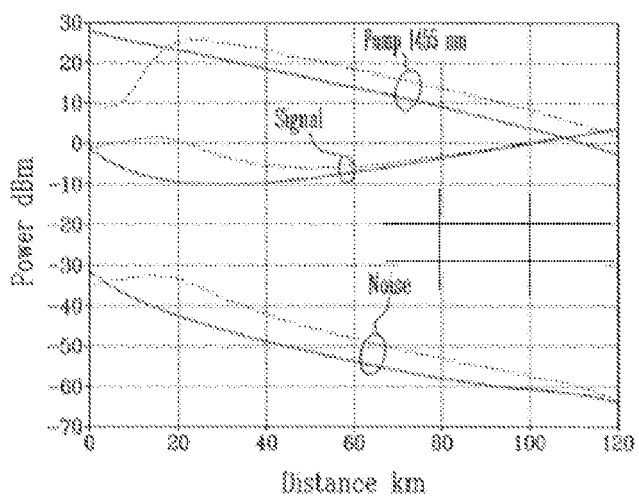
FIG. 1B is dependence of optical signal power and noise power vs. distance in an optical fiber span of the system of FIG. 1A, compared with analogous dependence of a previous prior art system.
Figure 2A:
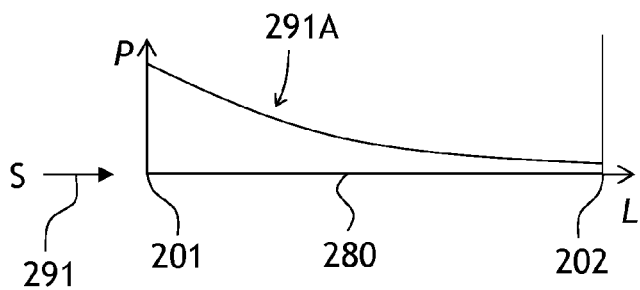
FIGS. 2A to 2D are dependences of optical signal power vs. distance in: a passive optical fiber span (FIG. 2A); a first-order Raman-pumped fiber span (FIG. 2B); a second-order Raman-pumped fiber span (FIG. 2C); and a third-order Raman-pumped fiber span (FIG. 2D)
Figure 2B:
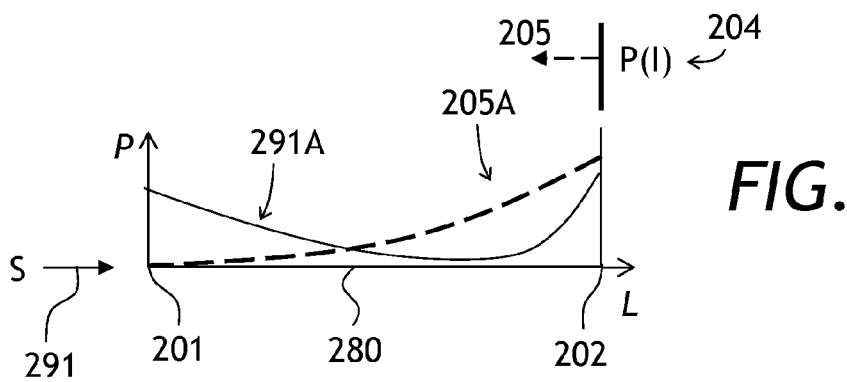

Referring to FIG. 2A, an optical signal "S" 291 is coupled to a first end 201 of a 60 km long optical fiber span 280. When left unamplified, the optical power P of the optical signal 291 decays with distance L along the optical fiber span 280 as shown with a decay curve 291A, so that the optical signal 291 arrives at a second end 202 of the optical fiber span 280 considerably attenuated. Turning to FIG. 2B, a first-order Raman pump "P(I)" 204 is coupled to the second end 202 of the optical fiber span 280. Emission 205 of the first-order Raman pump 204 amplifies the optical signal 291 in the optical fiber span 280, as indicated by the decay curve 291A having a bell-like shape in FIG. 2B. However, the emission 205 of the first-order Raman pump 204 itself decays as shown by a corresponding long-dashed decay curve 205A. Herein, both the signal S 291 and the first-order pump 204 typically include multiple wavelengths, whereas second- and third-order Raman pumps "P(II)" and "P(III)" considered below are preferably single-wavelength sources.

Figure 2C:
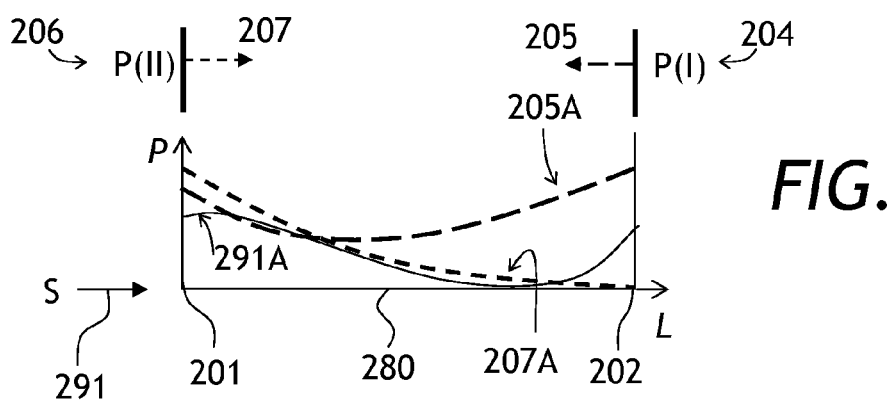

Referring now to FIG. 2C, a second-order Raman pump "P(II)" 206 is coupled to the first end 201 of the optical fiber span 280. Emission 207 of the second-order Raman pump 206 amplifies the emission 205 of the first-order Raman pump 204, as indicated by the corresponding decay curve 205A having a bell-like shape in FIG. 2C. The emission 205, in its turn, further amplifies the optical signal 291, further reducing the variation amplitude of the decay curve 291A of the optical signal 291. However, the emission 207 of the second-order Raman pump 206 itself decays as shown by a corresponding short-dashed curve 207A.

Figure 2D:
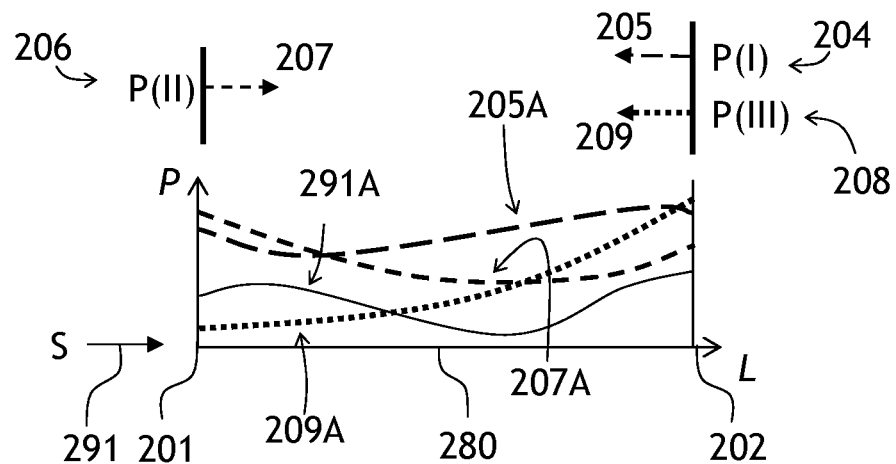

Turning to FIG. 2D, a third-order Raman pump "P(III)" 208 is coupled to the second end 202 of the optical fiber span 280. Emission 209 of the third-order Raman pump 208 amplifies the emission 207 of the second-order Raman pump 206, as indicated by the corresponding decay curve 207A of a bell-like shape in FIG. 2D. The emission 207, in its turn, further amplifies the emission 205 of the first-order Raman pump 204, which amplifies the optical signal 291, further straightening the decay curve 291A of the optical signal 291. However, the "lossless" transmission is still not achieved, as indicated by the wavy decay curve 291A of the optical signal 291. The emission 209 of the third-order Raman pump 208 itself decays as shown by a corresponding short-dashed curve 209A.

Figure 2E:
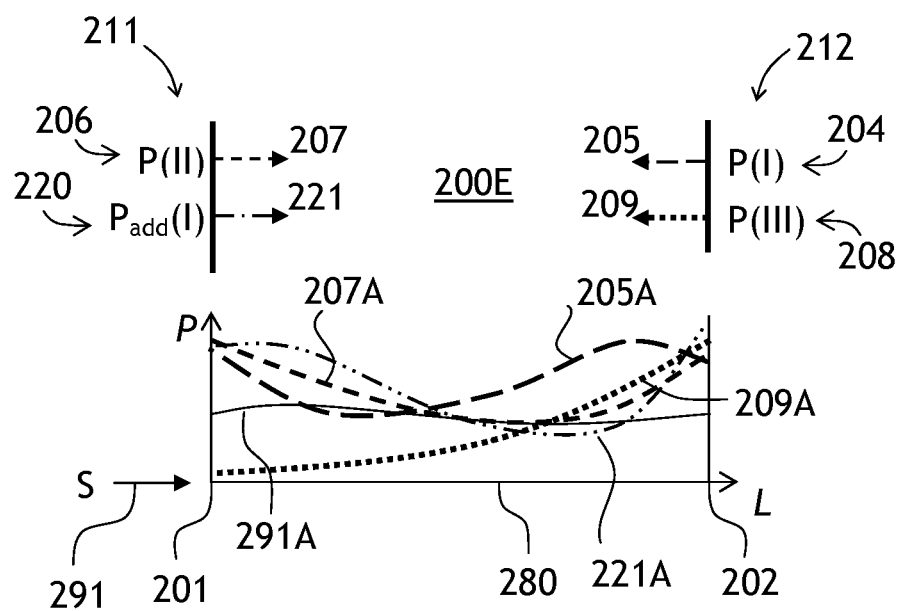
FIG. 2E is a schematic view of a transmission link including a third-order Raman-pumped fiber span with an additional Raman pump.

Referring now to FIG. 2E, a transmission link 200E is shown. First 211 and second 212 pump assemblies are optically coupled to the first 201 and second 202 ends of the optical fiber span 280, respectively. An additional first-order Raman pump 220 is coupled to the first pump assembly 211. Similar to FIG. 2B, the first-order Raman pumps 205 and 220 can be multi-wavelength pumps, and the signal 291 can contain multiple WDM channels. Even with the additional first-order Raman pump 220, the decay curve 291A of the optical signal 291 is not straight, showing multiple kinks and waving, indicating that the lossless transmission is not achieved.

The inventors have discovered that, when each pump assembly 211 and 212 includes at least two higher-order Raman pumps e.g. a second-order Raman pump and a third-order Raman pump, in addition to the first-order Raman pump (s), a nearly lossless transmission can be obtained over at least 60 km long transmission fiber span.

Figure 3:
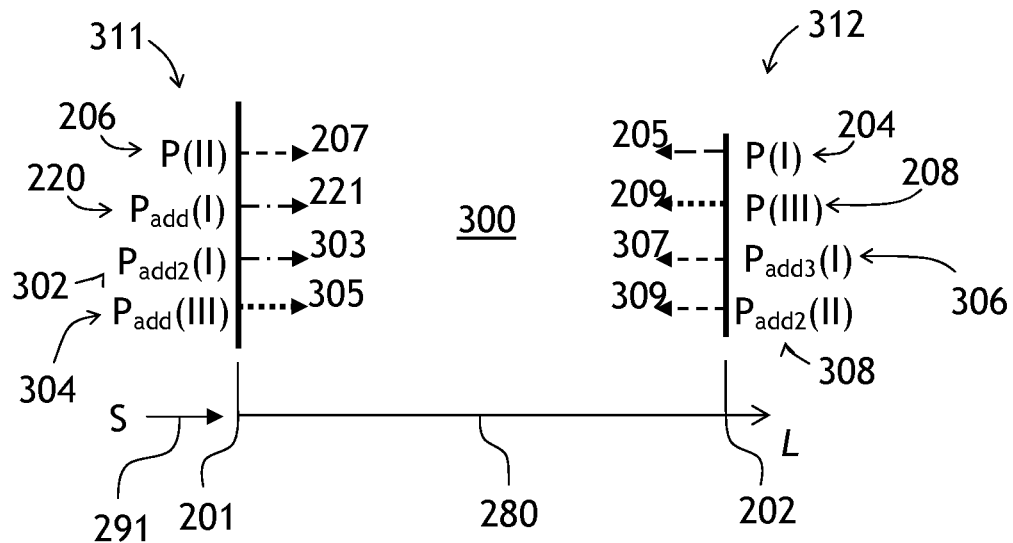
FIG. 3 is a schematic view of a transmission link of the invention including two first-order Raman pumps, one second-order Raman pump, and one third-order Raman pump on each side of an optical fiber span.

Turning to FIG. 3, a transmission link 300 for transmitting the optical signal 291 includes the optical fiber span 280 for propagating the optical signal 291 from the first end 201 to the second end 202. First 311 and second 312 pump assemblies are optically coupled to the first 201 and second 202 ends of the optical fiber span, respectively. In accordance with the invention, the first 311 and second 312 pump assemblies each include at least one single-wavelength or multi-wavelength first-order Raman pump for amplifying the optical signal 291, and first and second higher-order Raman pumps for providing higher-order Raman pump light for amplifying the first-order Raman pump light. With the higher-order pumps, the peak-to-peak variation of an optical power of the optical signal along the optical fiber span can be made less than 5 dB.

In the embodiment shown, the first pump assembly 311 includes the first additional first-order Raman pump 220 and a second additional first-order Raman pump 302 for emitting first-order Raman pump light 303 for amplifying the optical signal 291. The first pump assembly 311 further includes the second-order Raman pump 206 and an additional third-order Raman pump 304 for emitting third-order Raman pump light 305. The second pump assembly 312 similarly includes two first-order Raman pumps 204 and 306 for emitting first-order Raman pump light 205 and 307, respectively, for amplifying the optical signal 291. The second pump assembly 312 further includes a second additional second-order Raman pump 308 for emitting second-order Raman pump light 309, and the third-order Raman pump 208 for emitting the third-order Raman pump 209. The first-order Raman pumps 220, 302, 204, 306; and the higher-order Raman pumps 206, 304, 208, and 308 are configured for operation at such emission wavelengths and non-zero optical power levels that the peak-to-peak variation of an optical power of the optical signal along the optical fiber span is less than 5 dB. The length of the optical fiber span 280 is at least 60 km.

Although a single first-order Raman pump may be used in each of the first 311 and second pump assemblies of the transmission link 300, multiple and/or multi-wavelength first-order Raman pumps are preferred for a common case where the optical signal 291 includes a plurality of wavelength channels spanning a wavelength range of at least 25 nm. In this case, each Raman pump 206, 220, 302, 304; and 204, 208, 306, and 308 of each one of the first 311 and second 312 pump assemblies, respectively, can be operated so that a peak-to-peak variation of an optical power of each one of the wavelength channels along the optical fiber span is less than 5 dB. The optimal emission wavelengths and optical power levels can be determined by running a numerical optimization of propagation of the optical signal 291 in the optical fiber span 280. The numerical simulations can be performed by using a commercial transmission simulation software such as VPI Transmission Maker Optical Amplifiers produced by VPI Systems, New Jersey, USA.

Figure 4:
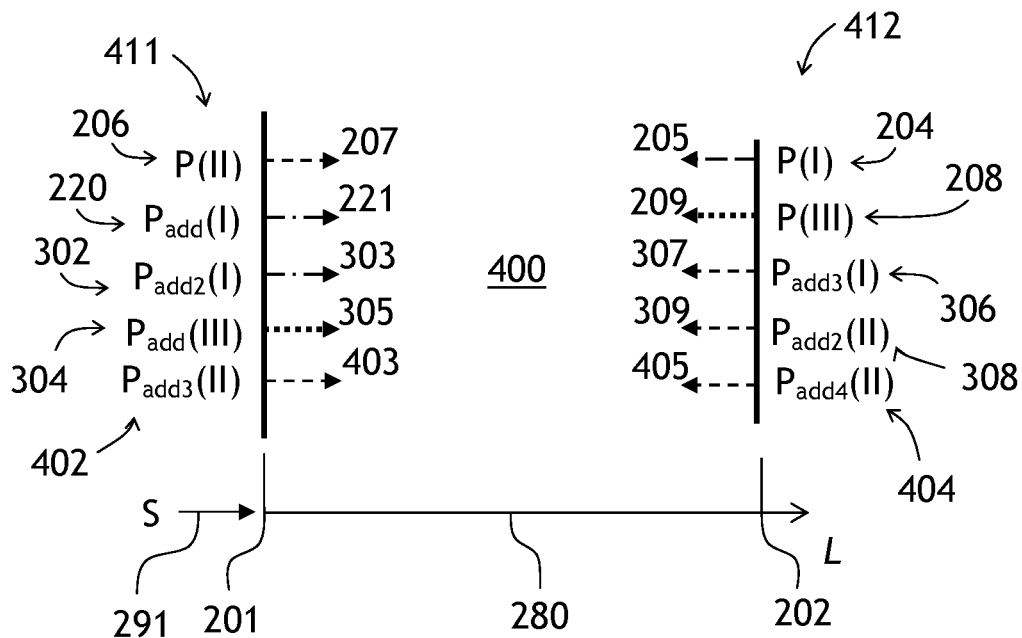
FIG. 4 is a schematic view of a transmission link of the invention including two first-order Raman pumps, two second-order Raman pumps, and one third-order Raman pump on each side of an optical fiber span.

Referring now to FIG. 4 with further reference to FIG. 3, a transmission link 400 is similar to the transmission link 300 of FIG. 3. A first pump assembly 411 of the transmission link 400 of FIG. 4 further includes a third additional second-order Raman pump "$P_{add3}$(II)" 402 for providing additional second-order Raman pump light 403 for amplifying the first-order Raman pump light 205, 221, 303, and 307. A second pump assembly 412 further includes a fourth additional second-order Raman pump "$P_{add4}(II)$" 404 for providing additional second-order Raman pump light 405 for amplifying the first-order Raman pump light 205, 221, 303, and 307. The emission wavelengths and optical power levels of the third 402 and fourth 404 additional second-order Raman pumps are selected by simulation to lessen the peak-to-peak variation of the optical power of each one of the wavelength channels along the optical fiber span 280 to be less than 4 dB, preferably for the lengths of the optical fiber span 280 not exceeding 100 km.

Figure 5:
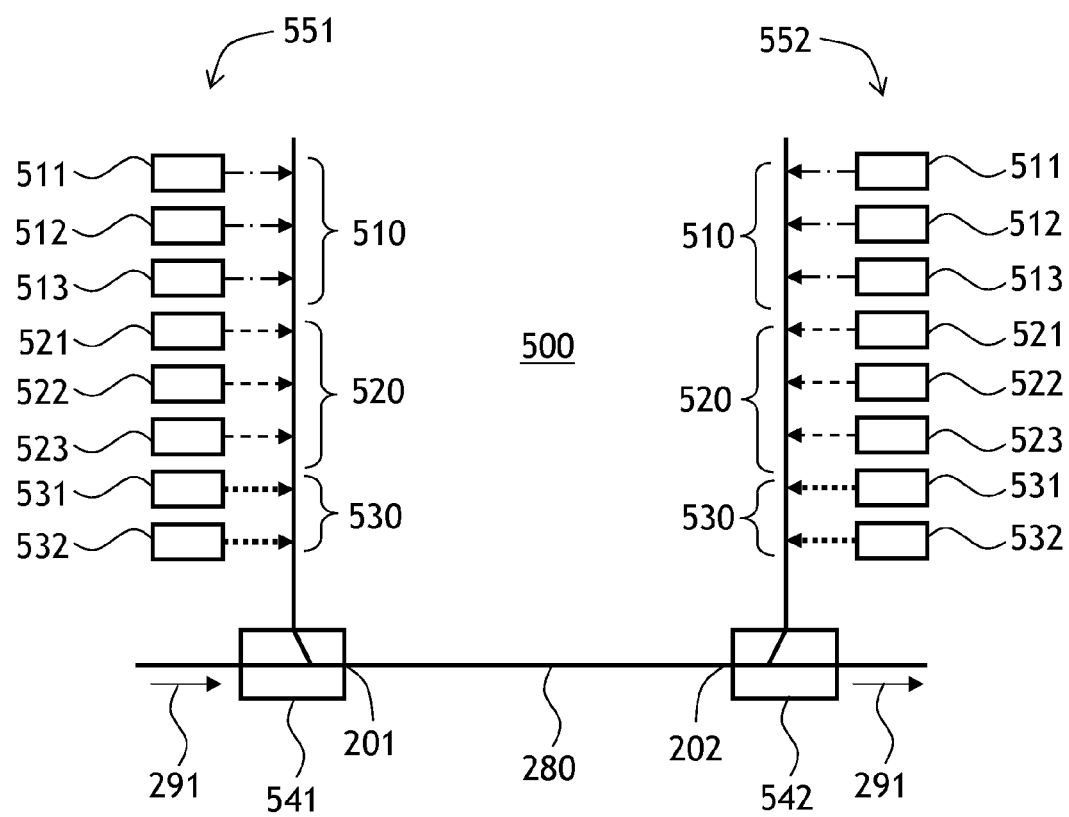
FIG. 5 is a schematic view of a transmission link of the invention including three first-order Raman pumps, three second-order Raman pumps, and two second-order Raman pumps on each side of an optical fiber span.

Turning to FIG. 5, a transmission link 500 for transmitting the optical signal 291 including a plurality of wavelength channels spanning a wavelength range of at least 25 nm, has the optical fiber span 280 extending for at least 60 km, preferably less than 120 km, and more preferably between 80 km and 100 km, between its first end 201 and the second opposed end 202. First 541 and second 542 WDM combiners are optically coupled to the first 201 and second 202 ends of the optical fiber span 280, respectively, for coupling pump light into the optical fiber span 280. First 551 and second 552 pump subassemblies are optically coupled to the first 541 and second 542 WDM combiners, respectively, for providing the pump light.

The first 551 and second 552 pump subassemblies each include first 511 and second 512 first-order Raman pumps for providing first-order Raman pump light 510 for amplifying the optical signal 280; first 521 and second 522 second-order Raman pumps for providing second-order Raman pump light 520 for amplifying the first-order Raman pump light 510; and a first third-order Raman pump 531 for providing third-order Raman pump light 530 for amplifying the second-order Raman light 520. The first 511, 521 and second 512, 522 first-order and second-order Raman pumps and the first third-order Raman pump 531 of the first 551 and second 552 pump subassemblies can be configured for operation at such emission wavelengths and non-zero optical power levels that the peak-to-peak variation of the optical power of each wavelength channel of the optical signal 291 along the optical fiber span 280 is less than 4 dB.

The first 551 and second 552 pump subassemblies can each further include an optional second third-order Raman pump 532 for providing the third-order Raman pump light 530 for amplifying the second-order Raman light 520. The second third-order Raman pumps 532 are configured for operation at such emission wavelengths and non-zero optical power levels that the peak-to-peak variation of each wavelength channel of the optical signal 291 along the optical fiber span is less than 3 dB.

The first 551 and second 552 pump subassemblies can each further include an optional third first-order Raman pump 513 for providing the first-order Raman pump light 510 for amplifying the optical signal 291, and a third second-order Raman pump 523 for providing the second-order Raman pump light 520 for amplifying the first-order Raman light 510. The emission wavelengths and non-zero optical power levels of the third first-order 513 and second-order 523 Raman pumps of the first 551 and second 552 pump subassemblies are selected by simulations to lessen the peak-to-peak variation of each wavelength channel of the optical signal 291 along the optical fiber span to 2 dB or less.

It is noted that due to multitude of nonlinear optical interactions between the first-order Raman pumps 511 to 513; and the higher-order Raman pumps 521 to 523, 531, and 532, higher-order pumps will generally provide some pumping of any pump light at a longer wavelength. The energy can flow even between a same order pump light in some cases, especially when the wavelengths of the pumps of a same order differ by at least 10 nm. To avoid confusion, herein and throughout the specification, the term "first-order Raman pump" refers to a Raman pump that pumps predominantly, that is, more than any other light, the optical signal 291; the term "second-order pump light" refers to a Raman pump that pumps predominantly the first-order pump light e.g. 510; and the term "third-order pump light" refers to a Raman pump that pumps predominantly the second-order pump light e.g. 520. Typically, the emission wavelength of each second-order Raman pump 521 to 523 is least 10 nm shorter than the emission wavelength of each first-order Raman pump 511 to 513; and the emission wavelength of each third-order Raman pump 531, 532 is at least 10 nm shorter than the emission wavelength of each second-order Raman pump 521 to 523.

The emission wavelengths of the Raman pumps 511 to 513; 521 to 523; 531, 532 of both the first 551 and second 552 pump subassemblies are preferably shifted relative to each other by at least 5 nm to enable easy combining by the WDM combiners 541, 542. The WDM combiners 541, 542 can include thin-film interference filters, Mach-Zehnder interferometers, or other suitable optical elements. Emission 510, 520, 530 of the Raman pumps 511 to 513; 521 to 523; 531 and 532, respectively, can be combined in any convenient order. For example, the first-order Raman pump light 510 of the first-order Raman pumps 511 to 513 can be combined separately from the second-order 520 and third-order 530 Raman pump light. When the first-order Raman pumps 511 to 513 have emission wavelengths separated by at least 5 nm, a thin-film WDM filter based pump combiner (not shown) can be employed to combine light beams of the first-order Raman pumps 511 to 513 into the single emission 510. Similar WDM thin film filter based pump combiners can also used to combine the emission 520 of the second-order Raman pumps 521 to 523; and to combine the emission 530 of the third-order Raman pumps 531 and 532. Then, an additional WDM pump combiner, not shown, can be used to combine the emissions 510, 520, and 530 into a single pump beam. Alternatively or in addition, a multi-wavelength Raman source, or even a light source having a continuous emission band, can be used.

Figure 6:
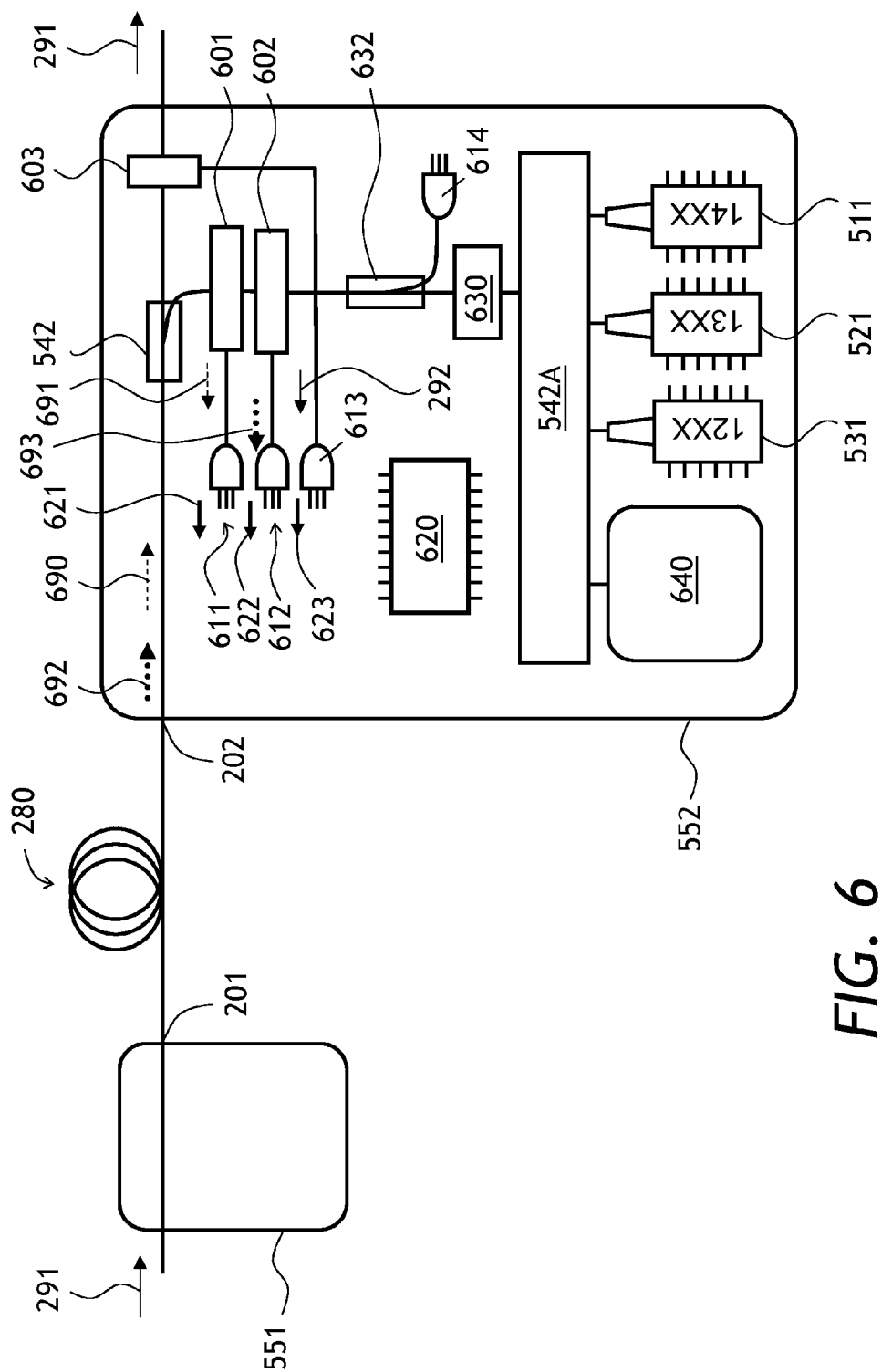
FIG. 6 is a schematic block diagram of a transmission link of the invention, showing details of a counter-pumping subassembly.

Referring to FIG. 6, the pump subassemblies 551 and 552 can be implemented in a modular form including an active feedback control. In FIG. 6, the construction of the second pump subassembly 552 is shown in more detail. The first pump assembly 551 can be similarly constructed. The second pump subassembly 552 includes a first WDM splitter 601 optically coupled to the second end 202 of the optical fiber span 280 via the second WDM combiner 542 for splitting off a portion 691 of residual pump light 690 propagated through the optical fiber span 280 from the first pump subassembly 551. A first photodetector 611 is optically coupled to the first WDM splitter 601 for receiving the residual pump light portion 691 and generating a first electrical signal 621 in response to the residual pump light portion 691.

Of the Raman pumps 511 to 513, 521 to 523, 531, and 532 of FIG. 5, only first Raman pumps 511, 521, and 531 are shown in FIG. 6 for brevity. More Raman pumps can be coupled. The emission of the Raman pumps e.g. first Raman pumps 511, 521, and 531 can be coupled together by a secondary WDM coupler 542A.

In the embodiment shown, the second pump subassembly 552 further includes a controller 620 operationally coupled to the first photodetector 611 and each Raman pump of the second pump subassembly 552. The controller 620 has a non-transitional memory, not shown, for storing therein a first look-up table of values of the first electrical signal 621 and associated power levels of each Raman pump 511 to 513, 521 to 523, 531, 532, and 640 of the second pump subassembly 552, required to lessen optical power variation of the wavelength channels of the optical signal 291. The controller 620 can be configured to dynamically adjust power levels of each Raman pump 511 to 513, 521 to 523, 531, 532, and 640 of the second pump subassembly 552 in dependence upon the first electrical signal 621 generated by the first photodetector 611 based on the first look-up table, so as to lessen the peak-to-peak variation of the optical power of the optical signal 291. The first look-up table can be pre-defined in a computer simulation establishing a relationship between optical power level of the portion 691 of the residual pump light 690 and optimal performance parameters e.g. optimal power levels of each Raman pump 511 to 513, 521 to 523, 531, 532, and 640 of the second pump subassembly 552.

In one embodiment, the second pump subassembly 552 further includes a second WDM splitter 602 optically coupled to the second end 202 of the optical fiber span 280 for splitting off a portion 693 of amplified spontaneous emission (ASE) 692 generated in the optical fiber span 280; and a second photodetector 612 optically coupled to the second WDM splitter 602 for receiving the ASE portion 693 and generating a second electrical signal 622 in response to the ASE portion 693. The controller 620 is operationally coupled to the second photodetector 602 and has stored in the non-transitional memory a second look-up table of values of the second electrical signal 622 and associated power levels of each Raman pump 511 to 513, 521 to 523, 531, 532, and 640 of the second pump subassembly 552. The controller 620 is configured to adjust the power levels of each Raman pump 511 to 513, 521 to 523, 531, 532, and 640 of the second pump subassembly 552 based on the second look-up table and in dependence upon the second electrical signal 622 generated by the second photodetector 612, so as to further lessen the peak-to-peak variation of the optical power of the optical signal 291. The second look-up table can be pre-defined in a computer simulation establishing a relationship between optical power level of the portion 693 of the ASE 692 and optimal performance parameters e.g. optimal power levels of each Raman pump 511 to 513, 521 to 523, 531, 532, and 640 of the second pump sub assembly 552.

The second pump subassembly 552 can also include a third WDM splitter 603 optically coupled to the second end 202 of the optical fiber span 208 for splitting off a portion 292 of the optical signal 291; and a third photodetector 613 optically coupled to the third WDM splitter 603 for receiving the optical signal portion 292 and generating a third electrical signal 623 in response to the signal portion 292. In this embodiment, the controller 620 is operationally coupled to the third photodetector 613 and has stored in the non-transitional memory a third look-up table of values of the third electrical signal 623 and associated power levels of each Raman pump 511 to 513, 521 to 523, 531, 532, and 640 of the second pump subassembly 552. The controller 620 is configured to adjust the power levels of each Raman pump 511 to 513, 521 to 523, 531, 532, and 640 of the second pump subassembly 552 based on the third look-up table and in dependence upon the third electrical signal 623 generated by the third photodetector 613, so as to further lessen the peak-to-peak variation of the optical power of the optical signal 291. The third look-up table can be pre-defined in a computer simulation establishing a relationship between the optical power level of the optical signal portion 292 and optimal performance parameters e.g. optimal power levels of each Raman pump 511 to 513, 521 to 523, 531, 532, and 640 of the second pump subassembly 552. Thus, the controller 620 can use information provided by the electrical signals 611, 612, 613, 614 to compute appropriate control parameters for driving the Raman pumps 511 to 513, 521 to 523, 531, 532, and 640.

The second pump subassembly 552 can also include a depolarizer 630 e.g. a dual stage Lyot depolarizer, and a splitter 632 coupled to a fourth photodetector 614, for measuring reflected pump light. To reduce the total number of Raman pumps, a multi-wavelength Raman pump source 640 can be provided including a multi-wavelength light source of the first order, second order, and/or third order, having a continuous emission band having a 3 dB bandwidth of at least 25 nm. The first pump subassembly 551, and the pump assemblies 211 and 212 of the optical transmission links 200E of FIG. 2E, 300 of FIG. 3, 400 of FIG. 4, and 500 of FIG. 5 for that matter, can be similarly constructed.

In accordance with the invention, the total number of Raman pumps can be further increased to further reduce the peak-to-peak variation of optical power of the optical signal 291 and/or individual wavelength channels of the optical signal 291, propagating in the optical fiber span 280. In the numerical simulations discussed below, a total of fifteen Raman pumps for the first pump subassembly 551 and fourteen Raman pumps for the second pump subassembly were used. The emission wavelengths and the optical power levels of these pumps are summarized in Table 1 (co-pumps, the first pump subassembly 551) and Table 2 (counter-pumps, the second pump subassembly 552) below. The optical power levels over 100 mW and corresponding wavelength are highlighted in bold font.

TABLE 1

| Co-pump wavelength, nm | 1220 | 1230 | 1240 | 1250 | 1260 | 1270 | 1310 |
|---|---|---|---|---|---|---|---|
| Co-pump power, mW | 17.8 | 407.5 | 35.5 | 44.3 | 32.7 | 37 | 30.8 |
| Co-pump wavelength, nm | 1320 | 1330 | 1340 | 1350 | 1360 | 1430 | 1445 | 1462 |
| Co-pump power, mW | 413.4 | 21.4 | 23.6 | 313.3 | 12.7 | 1.4 | 1.8 | 25 |

TABLE 2

| Counter-pump wavelength, nm | 1225 | 1235 | 1245 | 1255 | 1265 | 1275 | 1315 |
|---|---|---|---|---|---|---|---|
| Counter-pump power, mW | 12.6 | 402.3 | 11.1 | 10.5 | 11.1 | 103.8 | 82.8 |
| Counter-pump wavelength, nm | 1325 | 1335 | 1345 | 1355 | 1365 | 1425 | 1455 |
| Counter-pump power, mW | 399 | 20.3 | 20.4 | 293.4 | 22.5 | 1.1 | 16.2 |

Figure 7:
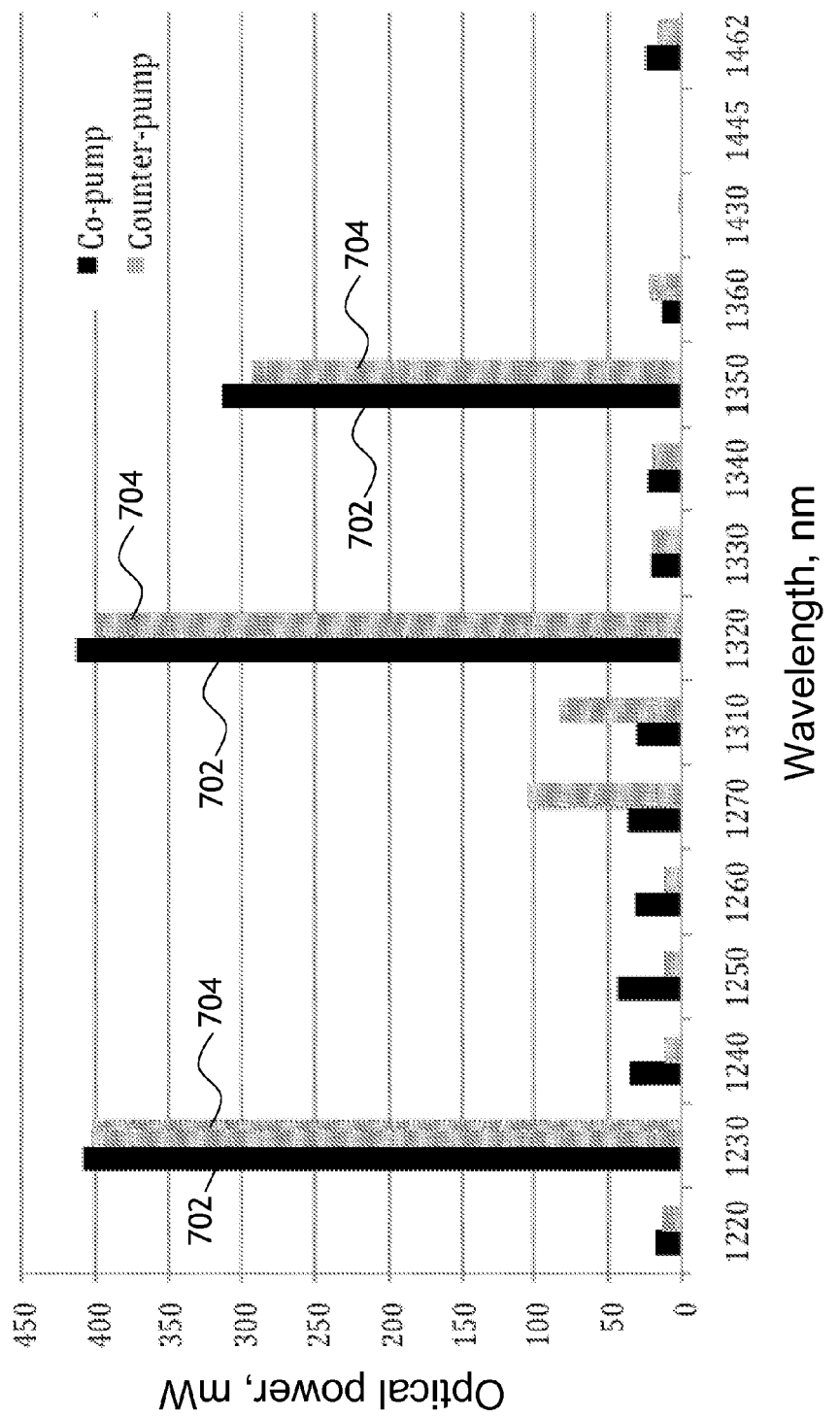
FIG. 7 is a power level diagram showing optical power levels and wavelengths of Raman pumps of a simulated transmission link.

Referring to FIG. 7, the values of Tables 1 and 2 are shown in graphical form. Solid columns 702 denote co-pumps provided by the first pump subassembly 551, and shaded columns 704 denote counter-pumps provided by the second pump subassembly 552. One can see that some of the pump powers are quite negligible as compared with the most powerful pumps of 300-400 mW, and can be omitted in practical devices with minor impact on longitudinal flatness.

Figure 8:
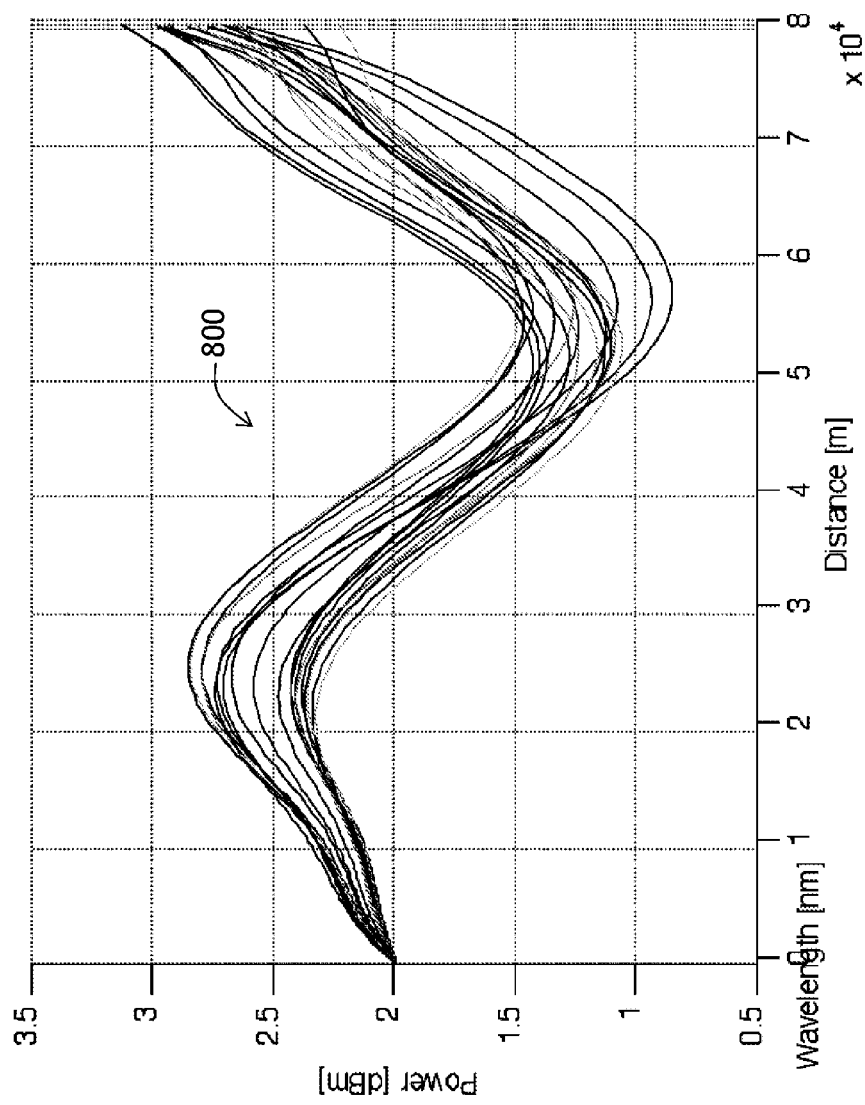
FIG. 8 is a computed dependence of optical power level of individual wavelength channels vs. distance in a 80 km long fiber span of the simulated transmission link.
Figure 9:
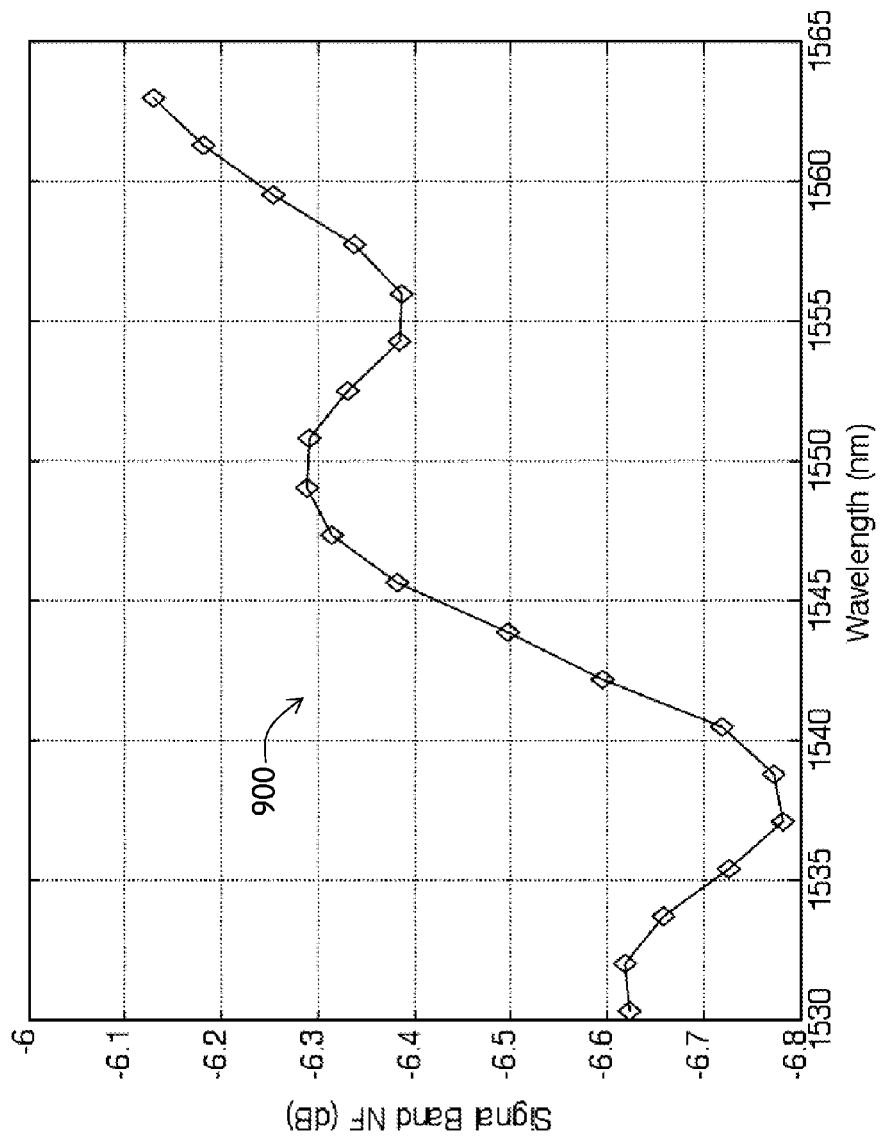
FIG. 9 is a computed dependence of a noise figure (NF) vs. wavelength in the 80 km long fiber span of the simulated transmission link.

Turning to FIG. 8, a dependence 800 of optical power level of individual wavelength channels vs. distance in a 80 km long fiber span 280, pumped with the Raman pumps having parameters of Tables 1 and 2 and FIG. 7, was computed using an optical transmission simulation software. Wavelength channels are equally spaced between 1530.33 nm and 1563.05 nm in this example. The channel optical power levels are shown as a function of traveled distance in the optical fiber span 280. One can see from FIG. 8 that most of the channels had optical power varying less than +−1 dB, that is, less than 2 dB peak-to-peak variation. Effective noise figure (NF) 900 for such fiber, evaluated using ON/OFF method commonly used for Raman amplifiers, is shown in FIG. 9. The effective NF is better than −6 dB for transmission fiber lengths longer than 8 km.

Figure 10:
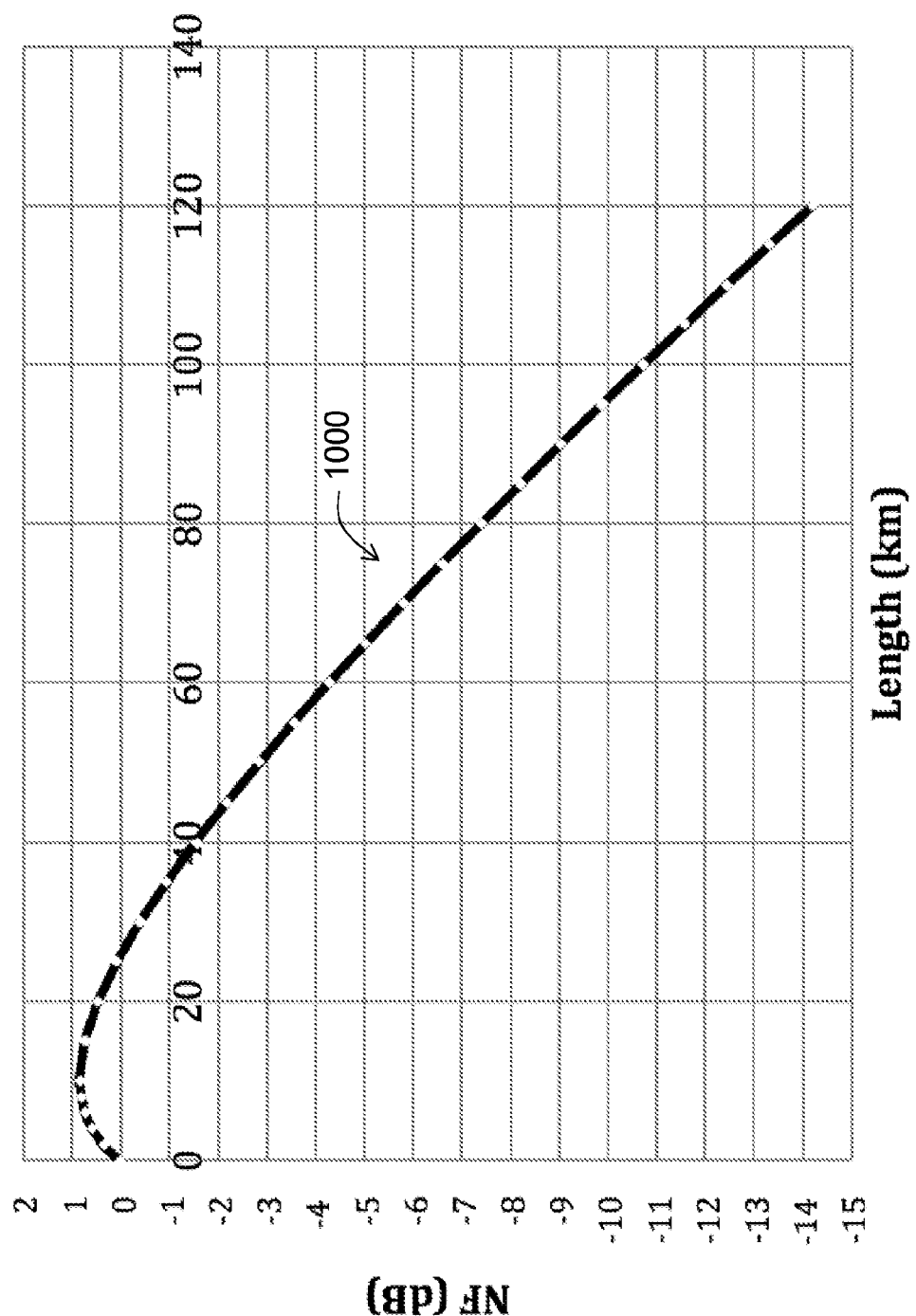
FIG. 10 is a computed dependence of a theoretical best possible NF vs. distance in an optical fiber span.

Referring to FIG. 10, a theoretical curve 1000 shows a best possible NF for the first wavelength channel at 1530 nm, as a function of the traveled distance in the optical fiber span 280. The best possible NF is achieved if optical power did not vary at all along the optical fiber span 280. One can see that the best possible NF at the distance of 80 km used in the simulations is about −7.4 dB, which is close to the values obtained in the NF simulations 900 shown in FIG. 9.

Referring back to FIG. 7 and Tables 1 and 2, with further reference to FIG. 8, the substantially lossless performance at the peak-to-peak optical power variations of less than 2 dB was obtained by having one third-order Raman pump and two second-order Raman pumps having an optical power of over 100 mW on each side of the optical fiber span 280.

For C-band wavelength channels spanning between 1528 nm and 1565 nm and more preferably between 1535 and 1560 nm, the emission wavelengths of each first-order Raman pump 204 and 220 (FIG. 2E) and 511 to 513 (FIG. 5) can be between 1420 nm and 1470 nm. The emission wavelengths of each second-order Raman pump 206 (FIG. 2E) and 521 to 523 (FIG. 5) can be between 1320 nm and 1420 nm. The emission wavelength of each third-order Raman pump 208 (FIG. 2E) and 531, 532 (FIG. 5) can be between 1220 nm and 1320 nm.

To amplify wavelength channels of both C- and L-bands, that is, for the wavelength channels spanning between 1528 nm and 1625 nm, and more preferably between 1535 nm and 1615 nm, the emission wavelengths of each first-order Raman pump 204 and 220 (FIG. 2E) and 511 to 513 (FIG. 5) can be between 1420 nm and 1520 nm. The emission wavelengths of each second-order Raman pump 206 (FIG. 2E) and 521 to 523 (FIG. 5) can be between 1300 nm and 1420 nm. The emission wavelength of each third-order Raman pump 208 (FIG. 2E) and 531, 532 (FIG. 5) can be between 1200 nm and 1300 nm. These numbers however are approximate, since Raman pumps of a same "Raman order" can pump each other, as explained above.

Figure 11:
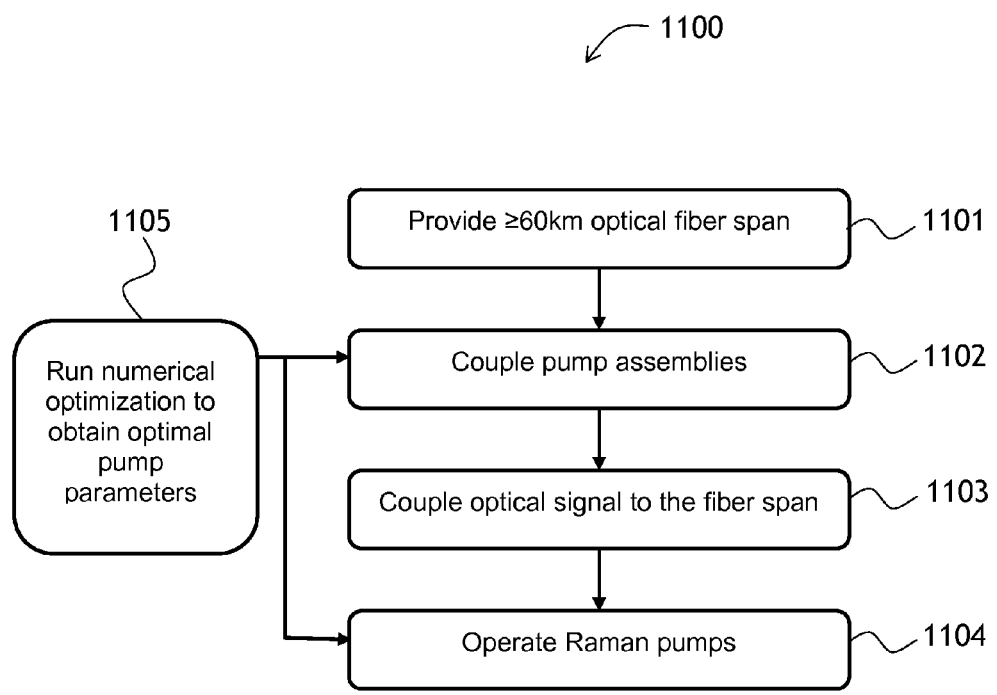
FIG. 11 is a flow chart of an exemplary method of obtaining a substantially lossless transmission of an optical signal in a multiple-order Raman-pumped optical fiber span.

Turning now to FIG. 11, a method 1100 of obtaining a substantially lossless transmission of the optical signal 291 propagating from the first 201 to the second 202 end of the optical fiber span 280 (FIG. 2E; FIGS. 5, 6) includes a step 1101 (FIG. 11) of providing the optical fiber span 280 having a length of at least 60 km and preferably at least 80 km, but less than 120 km, between the first 201 and second 202 ends. In a step 1102, the first 551 and second 552 pump subassemblies are optically coupled, e.g. via the WDM pump combiners 541 and 542, to the to the first 201 and second 202 ends of the optical fiber span 280, respectively. The first 551 and second 552 pump subassemblies each include the $N_1$ first-order Raman pumps e.g. 511 to 513 and $N_2$ higher-order Raman pumps e.g. the second-order Raman pumps 521 to 523 and/or the third-order Raman pumps 531, 532. The number $N_1$ is an integer ≥1, and the number $N_2$ is an integer ≥2. In other words, at least one Raman pump of each order is provided, and at least two higher-order Raman pumps are provided in each of the first 551 and second 552 pump subassemblies.

Upon completion of steps 1101 and 1102, in a next step 1103, the optical signal 280 is coupled to the first end 201 of the optical fiber span 280. Finally, in a step 1104, the $N_1$ first-order Raman pumps and the $N_2$ higher-order Raman pumps are operated at such optimal emission wavelengths and optical power levels that a peak-to-peak variation $\Delta P_{P2P}$ of an optical power P of the optical signal along the optical fiber span is less than 5 dB.

The optimal emission wavelengths and optical power levels, used in the last step 1104, can be determined in advance in a step 1105 of running a numerical optimization of propagation of the optical signal 291 in the optical fiber span 280. The numerical simulations can be performed by using a commercial transmission simulation software such as VPI Transmission Maker Optical Amplifiers. In the simulation, the optical fiber span 280 is pumped with the $N_1$ first-order and the $N_2$ higher-order Raman pumps. To determine the optimal emission wavelengths and optical power levels, the simulation varies the emission wavelengths and optical power levels of the $N_1$ first-order and the $N_2$ higher-order Raman pumps until the peak-to-peak variation $\Delta P_{P2P}$ of an optical power P of the optical signal along the optical fiber span is less than 5 dB. The determined optimal values of the emission wavelengths and optical power levels are then used to operate the Raman pumps in the operating step 1104.

In a preferred embodiment, the optical signal includes a plurality of wavelength channels spanning a wavelength range of at least 25 nm; $N_1$ is ≥2; and the $N_2$ higher-order Raman pumps of the first and second pump subassemblies each include one second-order Raman pump and one third-order Raman pump. In a further preferred embodiment, $N_1≥2$, $N_2≥3$, the $N_2$ higher-order Raman pumps of the first and second pump subassemblies each including two second-order Raman pumps and one third-order Raman pump. The increased number of Raman pump allows one to further reduce $\Delta P_{P2P}$ to a value of ≤4 dB in the operating step 1104.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system comprising:
   first and second pump assemblies optically coupled to a first end and a second end of an optical fiber span, respectively, the first and second pump assemblies each comprising:
   a single-wavelength or multi-wavelength first-order Raman pump for providing first-order Raman pump light for amplifying an optical signal; and
   first and second higher-order Raman pumps for providing higher-order Raman pump light for amplifying the first-order Raman pump light; and
   a controller operationally coupled to a first photodetector, a second photodetector, and each Raman pump of the second pump assembly, wherein
   the first-order and the first and second higher-order Raman pumps are configured for operation at such emission wavelengths and non-zero optical power levels that a peak-to-peak variation of an optical power of the optical signal along the optical fiber span is less than 5 dB,
   the controller stores a first look-up table of values of a first electrical signal, generated by the first photodetector, and associated power levels of each Raman pump of the second pump assembly and a second look-up table of values of a second electrical signal, generated by the second photodetector, and associated power levels of each Raman pump of the second pump assembly, and the controller is configured to adjust, using the first look-up table and the second look-up table, power levels of each Raman pump of the second pump assembly based the first electrical signal and the second electrical signal to lessen the peak-to-peak variation of the optical power of the optical signal.

2. The system of claim 1, wherein
the optical signal includes a plurality of wavelength channels spanning a wavelength range of at least 25 nm,
the first and second pump assemblies each comprise a single-wavelength first-order Raman pump and an additional single-wavelength first-order Raman pump, and
each Raman pump, of the first and second pump assemblies, is configured for operation at such emission wavelengths and non-zero optical power levels that a peak-to-peak variation of an optical power of each one of the wavelength channels along the optical fiber span is less than 5 dB.

3. The system of claim 1, wherein the first and second higher-order Raman pumps, of the first and second pump assemblies, comprise a second-order Raman pump and a third-order Raman pump, respectively.

4. The system of claim 1, wherein the first and second pump assemblies each further comprise an additional second-order Raman pump configured for operation at such emission wavelengths and non-zero optical power levels that a peak-to-peak variation of the optical power of each one of a plurality of wavelength channels along the optical fiber span is less than 4 dB.

5. The system of claim 4, wherein the optical fiber span is less than 100 km long.

6. A system comprising:
first and second WDM combiners optically coupled to a first end and a second end of an optical fiber span, respectively, for coupling pump light;
first and second pump subassemblies optically coupled to the first and second WDM combiners, respectively, for providing the pump light, the first and second pump subassemblies each comprising:
first and second first-order Raman pumps for providing first-order Raman pump light for amplifying an optical signal;
first and second second-order Raman pumps for providing second-order Raman pump light for amplifying the first-order Raman light; and
a first third-order Raman pump for providing third-order Raman pump light for amplifying the second-order Raman light; and
a controller operationally coupled to a first photodetector, a second photodetector, and each Raman pump of the second pump subassembly, wherein
the first and second first-order and second-order Raman pumps and the first third-order Raman pump of the first and second pump subassemblies are configured for operation at such emission wavelengths and non-zero optical power levels that a peak-to-peak variation of optical power of each one of a plurality of wavelength channels along the optical fiber span is less than 4 dB,
the controller stores a first look-up table of values of a first electrical signal, generated by the first photodetector, and associated power levels of each Raman pump of the second pump subassembly and a second look-up table of values of a second electrical signal, generated by the second photodetector, and associated power levels of each Raman pump of the second pump subassembly, and the controller is configured to adjust, using the first look-up table and the second look-up table, power levels of each Raman pump of the second pump subassembly based the first electrical signal and the second electrical signal to lessen the peak-to-peak variation of the optical power of the optical signal.

7. The system of claim 6, wherein the first and second pump subassemblies each further comprise:
a second third-order Raman pump, for providing the third-order Raman pump light for amplifying the second-order Raman light, configured for operation at such emission wavelengths and non-zero optical power levels that a peak-to-peak variation of the optical power of each one of the plurality of wavelength channels along the optical fiber span is less than 3 dB.

8. The system of claim 6, wherein the first and second pump subassemblies each further comprise:
a third first-order Raman pump for providing the first-order Raman pump light for amplifying the optical signal; and
a third second-order Raman pump for providing the second-order Raman pump light for amplifying the first-order Raman pump light,
wherein the third first-order and the third second-order Raman pumps are configured for operation at such emission wavelengths and non-zero optical power levels that a peak-to-peak variation of the optical power of each one of the plurality of wavelength channels along the optical fiber span is less than 2 dB.

9. The system of claim 6, wherein
the emission wavelengths of each Raman pump in the first and second pump subassemblies differ from each other by at least 5 nm,
the second pump subassembly further comprises:
a first WDM splitter optically coupled to the second end of the optical fiber span for splitting off a portion of residual pump light propagated through the optical fiber span from the first pump subassembly, and
the first photodetector optically is coupled to the first WDM splitter for receiving the residual pump light portion and generating a first electrical signal in response to the residual pump light portion.

10. The system of claim 9, wherein
the second pump subassembly further comprises:
a second WDM splitter optically coupled to the second end of the optical fiber span for splitting off a portion of a Raman-generated co-propagated ASE generated in the optical fiber span, and
the second photodetector is optically coupled to the second WDM splitter for receiving the Raman-generated co-propagated ASE portion and generating a second electrical signal in response to the ASE portion.

11. The system of claim 10, wherein the second pump subassembly further comprises:
a third WDM splitter optically coupled to the second end of the optical fiber span for splitting off a portion of the optical signal; and
a third photodetector optically coupled to the third WDM splitter for receiving the optical signal portion and generating a third electrical signal in response to the portion of the optical signal, wherein
the controller is operationally coupled to the third photodetector;

the controller stores a third look-up table of values of the third electrical signal and associated power levels of each Raman pump of the second pump subassembly, and the controller is configured to adjust the power levels of each Raman pump of the second pump subassembly in dependence upon the third electrical signal generated by the third photodetector based on the third look-up table, so as to further lessen the peak-to-peak variation of the optical power of the optical signal.

12. The system of claim 6, wherein
an emission wavelength of each second-order Raman pump is least 10 nm shorter than an emission wavelength of each first-order Raman pump, and
an emission wavelength of each third-order Raman pump is at least 10 nm shorter than the emission wavelength of each second-order Raman pump.

13. The system of claim 12, wherein
the optical signal includes wavelengths between 1535 nm and 1615 nm,
the emission wavelength of each first-order Raman pump is between 1420 nm and 1520 nm,
the emission wavelength of each second-order Raman pump is between 1300 nm and 1420 nm, and
the emission wavelength of each third-order Raman pump is between 1200 nm and 1300 nm.

14. The system of claim 6, wherein a noise figure of each wavelength channel, of the plurality of wavelength channels, is at least −6 dB.

15. The system of claim 6, wherein at least one of the first or second pump subassemblies comprises a multi-wavelength Raman pump including a light source having a continuous emission band having a 3 dB bandwidth of at least 25 nm.

16. The system of claim 6, wherein the optical fiber span is absent Bragg gratings for reflecting pump light.

17. A method comprising:
optically coupling, to a first end and a second end of an optical fiber span, first and second pump subassemblies, respectively, the first and second pump subassemblies each comprising $N_1$ first-order Raman pumps and $N_2$ higher-order Raman pumps, wherein $N_1$ is an integer $\geq 1$, and $N_2$ is an integer $\geq 2$;
coupling an optical signal to the first end of the optical fiber span;
using pump controllers to operate the $N_1$ first-order Raman pumps and the $N_2$ higher-order Raman pumps at such emission wavelengths and optical power levels that a peak-to-peak variation $\Delta P_{P2P}$ of an optical power P of the optical signal along the optical fiber span is less than 5 dB;
storing a first look-up table of values of a first electrical signal, generated by a first photodetector, and associated power levels of each Raman pump of the second pump subassembly and a second look-up table of values of a second electrical signal, generated by a second photodetector, and associated power levels of each Raman pump of the second pump subassembly; and
adjusting, using the first look-up table and the second look-up table, power levels of each Raman pump of the second pump subassembly based the first electrical signal and the second electrical signal to lessen the peak-to-peak variation $\Delta P_{P2P}$ of an optical power P of the optical signal.

18. The method of claim 17, further comprising
running a numerical optimization of propagation of the optical signal in the optical fiber span pumped with the $N_1$ first-order Raman pumps and the $N_2$ higher-order Raman pumps,
wherein emission wavelengths and optical power levels of the $N_1$ first-order and the $N_2$ higher-order Raman pumps are varied to determine optimal emission wavelengths and optical power levels, at which the peak-to-peak variation $\Delta P_{P2P}$ of an optical power P of the optical signal along the optical fiber span is less than 5 dB, and
wherein the $N_1$ first-order and the $N_2$ higher-order Raman pumps are operated at the optimal emission wavelengths and optical power levels based on running the numerical optimization.

19. The method of claim 18, wherein
the optical signal includes a plurality of wavelength channels spanning a wavelength range of at least 25 nm, and
$N_1$ is $\geq 2$, and wherein the $N_2$ higher-order Raman pumps of the first and second pump subassemblies each include a second-order Raman pump and a third-order Raman pump.

20. The method of claim 18, wherein
the optical signal includes a plurality of wavelength channels spanning a wavelength range of at least 25 nm;
$N_1$ is $\geq 2$,
$N_2 \geq 3$,
the $N_2$ higher-order Raman pumps of the first and second pump subassemblies each include two second-order Raman pumps and one third-order Raman pump, and
$\Delta P_{P2P} \leq 4$ dB.

* * * * *